(12) United States Patent
Huang et al.

(10) Patent No.: US 8,492,920 B2
(45) Date of Patent: Jul. 23, 2013

(54) APPARATUS FOR GENERATING POWER FROM A TURBINE ENGINE

(71) Applicant: GE Aviation Systems LLC, Grand Rapids, MI (US)

(72) Inventors: Hao Huang, Troy, OH (US); Xiaochuan Jia, Centerville, OH (US); David Dimitri Karipides, Casstown, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 13/769,970

(22) Filed: Feb. 19, 2013

(65) Prior Publication Data

US 2013/0154359 A1    Jun. 20, 2013

Related U.S. Application Data

(63) Continuation of application No. 13/268,390, filed on Oct. 7, 2011.

(51) Int. Cl.
*H02P 9/10* (2006.01)

(52) U.S. Cl.
USPC .............................. 290/52; 322/89

(58) Field of Classification Search
USPC .................. 290/52, 7; 322/89, 100
See application file for complete search history.

(56) References Cited

U.S. PATENT DOCUMENTS

| | | | |
|---|---|---|---|
| 5,739,676 A * | 4/1998 | Judge et al. | 322/22 |
| 6,281,664 B1 * | 8/2001 | Nakamura et al. | 322/22 |
| 6,735,951 B2 * | 5/2004 | Thompson | 60/774 |
| 7,367,193 B1 | 5/2008 | Thompson | |
| 7,372,175 B2 | 5/2008 | Bouiller et al. | |
| 7,405,542 B1 * | 7/2008 | McAvoy | 322/14 |
| 7,578,136 B2 | 8/2009 | Derouineau et al. | |
| 7,582,981 B1 | 9/2009 | Meller | |
| 7,609,536 B2 | 10/2009 | Brochu et al. | |
| 7,707,909 B2 | 5/2010 | Linet et al. | |
| 7,813,147 B2 | 10/2010 | Blanchery | |
| 7,870,742 B2 | 1/2011 | Lee et al. | |
| 7,969,122 B2 * | 6/2011 | Lemmers et al. | 322/59 |
| 8,112,983 B2 * | 2/2012 | Bradbrook et al. | 60/204 |
| 8,319,481 B2 * | 11/2012 | Lemmers et al. | 322/89 |
| 2003/0126864 A1 * | 7/2003 | Thompson | 60/788 |
| 2005/0056021 A1 | 3/2005 | Belokon et al. | |
| 2005/0126182 A1 | 6/2005 | Teets et al. | |
| 2005/0180862 A1 | 8/2005 | Lando | |
| 2006/0010875 A1 | 1/2006 | Mahoney et al. | |
| 2006/0021323 A1 | 2/2006 | Beardsley | |
| 2006/0034693 A1 | 2/2006 | Lardellier | |
| 2006/0108807 A1 | 5/2006 | Bouiller et al. | |
| 2006/0150633 A1 | 7/2006 | McGinley et al. | |
| 2006/0174629 A1 | 8/2006 | Michalko | |

(Continued)

FOREIGN PATENT DOCUMENTS

| EP | 1141522 A2 | 10/2001 |
|---|---|---|
| EP | 1198663 A1 | 4/2002 |

(Continued)

*Primary Examiner* — Nicholas Ponomarenko

(74) *Attorney, Agent, or Firm* — McGarry Bair PC

(57) ABSTRACT

An electrical architecture for an aircraft providing power for the aircraft by generating power from a high pressure spool and a low pressure spool of a turbine engine. The spools can be used to drive corresponding generators; the power from which can be used to supply the various loads of the aircraft.

15 Claims, 11 Drawing Sheets

U.S. PATENT DOCUMENTS

| | | |
|---|---|---|
| 2006/0183593 A1 | 8/2006 | Beutin et al. |
| 2006/0192535 A1 | 8/2006 | Lando |
| 2006/0225431 A1 | 10/2006 | Kupratis |
| 2006/0225432 A1 | 10/2006 | Awdalla |
| 2006/0272313 A1 | 12/2006 | Eick et al. |
| 2006/0277920 A1 | 12/2006 | Bart et al. |
| 2007/0022735 A1 | 2/2007 | Henry et al. |
| 2007/0089420 A1 | 4/2007 | Klingels |
| 2007/0240426 A1 | 10/2007 | Wiegman et al. |
| 2007/0265761 A1 | 11/2007 | Dooley et al. |
| 2008/0047376 A1 | 2/2008 | Venter |
| 2008/0138195 A1 | 6/2008 | Kern et al. |
| 2008/0143108 A1 | 6/2008 | El-Refaie et al. |
| 2008/0143115 A1 | 6/2008 | Kern et al. |
| 2008/0148881 A1 | 6/2008 | Moniz et al. |
| 2008/0149445 A1 | 6/2008 | Kern et al. |
| 2008/0150287 A1 | 6/2008 | Kern et al. |
| 2008/0191493 A1 | 8/2008 | Christensen et al. |
| 2008/0200299 A1 | 8/2008 | Russ |
| 2008/0238202 A1 | 10/2008 | Kern et al. |
| 2008/0277944 A1 | 11/2008 | Schwarz et al. |
| 2009/0007569 A1 | 1/2009 | Lemmers, Jr. et al. |
| 2009/0039653 A1 | 2/2009 | Beutin et al. |
| 2009/0064683 A1 | 3/2009 | Moniz et al. |
| 2009/0146425 A1 | 6/2009 | Widisky |
| 2009/0184691 A1 | 7/2009 | Birdi et al. |
| 2009/0256522 A1 | 10/2009 | Pellen |
| 2009/0272121 A1 | 11/2009 | Youssef |
| 2009/0288421 A1 | 11/2009 | Zeiner et al. |
| 2010/0000226 A1 | 1/2010 | Rensch |
| 2010/0026089 A1 | 2/2010 | Anghel et al. |
| 2010/0043388 A1 | 2/2010 | Mason et al. |
| 2010/0107650 A1 | 5/2010 | Ress, Jr. et al. |
| 2010/0127496 A1 | 5/2010 | Burkholder et al. |
| 2010/0133813 A1 | 6/2010 | Cote et al. |
| 2010/0133832 A1 | 6/2010 | Butt |
| 2010/0141028 A1 | 6/2010 | Rozman et al. |
| 2010/0154380 A1 | 6/2010 | Tangirala et al. |
| 2010/0170262 A1 | 7/2010 | Kaslusky et al. |
| 2010/0200692 A1 | 8/2010 | Goi et al. |
| 2010/0206982 A1 | 8/2010 | Moore et al. |
| 2010/0236216 A1 | 9/2010 | Winter et al. |
| 2010/0251726 A1 | 10/2010 | Jones et al. |
| 2010/0314877 A1 | 12/2010 | Finney |
| 2012/0119020 A1* | 5/2012 | Burns et al. ............... 244/58 |
| 2012/0167576 A1* | 7/2012 | Taneja ............... 60/772 |

FOREIGN PATENT DOCUMENTS

| | | |
|---|---|---|
| EP | 1568606 A2 | 8/2005 |
| EP | 0867323 B1 | 5/2006 |
| EP | 1873358 A2 | 1/2008 |
| EP | 2320067 A2 | 5/2011 |
| GB | 2440747 A | 2/2008 |
| JP | 2008038902 A | 2/2008 |
| WO | 2008082335 A1 | 7/2008 |
| WO | 2008082336 A1 | 7/2008 |
| WO | 2010034750 A2 | 4/2010 |
| WO | 2010135030 A2 | 11/2010 |

* cited by examiner

APPARATUS FOR GENERATING POWER FROM A TURBINE ENGINE

CROSS REFERENCE TO RELATED APPLICATION

This application is a continuation of U.S. patent application Ser. No. 13/268,390, filed Oct. 7, 2011, and is incorporated herein by reference.

BACKGROUND OF THE INVENTION

Turbine engines, and particularly gas turbine engines, also known as combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for airplanes, including helicopters. In airplanes, gas turbine engines are used for propulsion of the aircraft. Gas turbine engines can have two or more spools, including a low pressure (LP) spool that provides a significant fraction of the overall propulsion system thrust, and a high pressure (HP) spool that drives one or more compressors and produces additional thrust by directing exhaust products in an aft direction. A triple spool gas turbine engine includes a third, intermediate pressure (IP) spool.

Gas turbine engines also usually power a number of different accessories such as generators, starter/generators, permanent magnet alternators (PMA), fuel pumps, and hydraulic pumps, e.g., equipment for functions needed on an aircraft other than propulsion. For example, contemporary aircraft need electrical power for avionics, motors, and other electric equipment. A generator coupled with a gas turbine engine will convert the mechanical power of the engine into electrical energy needed to power accessories.

Autotransformers (ATUs) are frequently used in power applications to interconnect systems operating at different voltage classes and to reduce the harmonic contents of the generators and the ripples at the outputs of the rectifiers. In aircrafts, autotransformers typically are used to step up or down voltages between generators and rectifiers. ATUs are separate from the generator, and add to the weight and volume of the engine. Furthermore, ATUs often require a forced liquid cooling system, which adds additional weight and volume to the engine.

BRIEF DESCRIPTION OF THE INVENTION

In one embodiment, an electrical architecture for a turbine engine having a high pressure (HP) spool and a low pressure (LP) spool, the electrical architecture includes a first generator driven by the HP spool and providing a first DC output, a second generator driven by the LP spool and providing a second DC output, a first DC bus connected to the first DC output, a second DC bus connected to second DC output, wherein the first and second DC buses are selectively connected.

DESCRIPTION OF EMBODIMENTS OF THE INVENTION

The described embodiments of the present invention are directed to power extraction from an aircraft engine, and more particularly to an electrical power system architecture which enables production of electrical power from a turbine engine, preferably a gas turbine engine. It will be understood, however, that the invention is not so limited and has general application to electrical power system architectures in non-aircraft applications, such as other mobile applications and non-mobile industrial, commercial, and residential applications.

Figure 1:
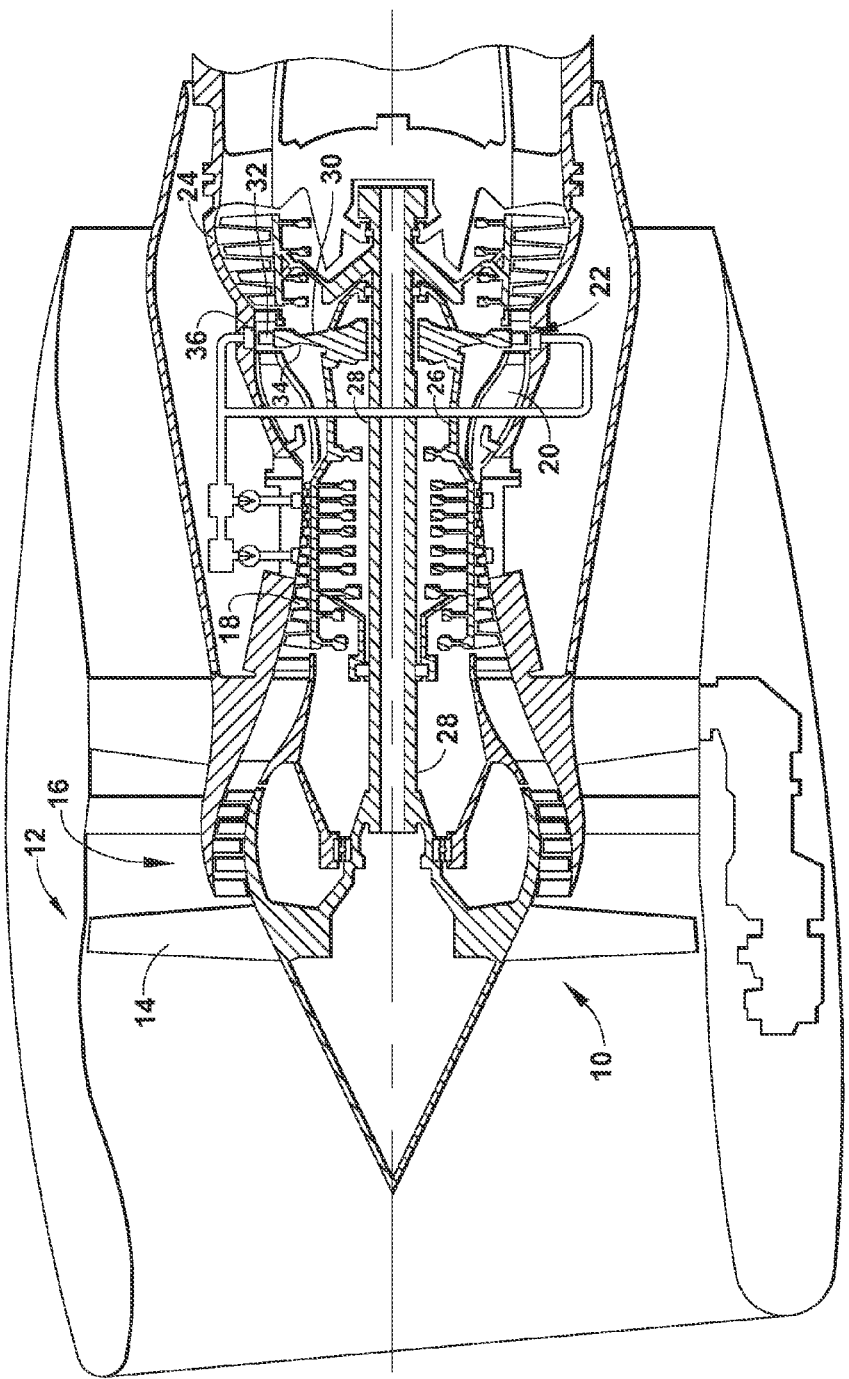
FIG. 1 is a schematic cross-sectional diagram of a gas turbine engine for an aircraft.

FIG. 1 is a schematic cross-sectional diagram of a gas turbine engine 10 for an aircraft. Engine 10 includes, in downstream serial flow relationship, a fan section 12 including a fan 14, a booster or low pressure (LP) compressor 16, a high pressure (HP) compressor 18, a combustion section 20, a HP turbine 22, and a LP turbine 24. A HP shaft or spool 26 drivingly connects HP turbine 22 to HP compressor 18 and a LP shaft or spool 28 drivingly connects LP turbine 24 to LP compressor 16 and fan 14. HP turbine 22 includes an HP turbine rotor 30 having turbine blades 32 mounted at a periphery of rotor 30. Blades 32 extend radially outwardly from blade platforms 34 to radially outer blade tips 36.

Figure 2:
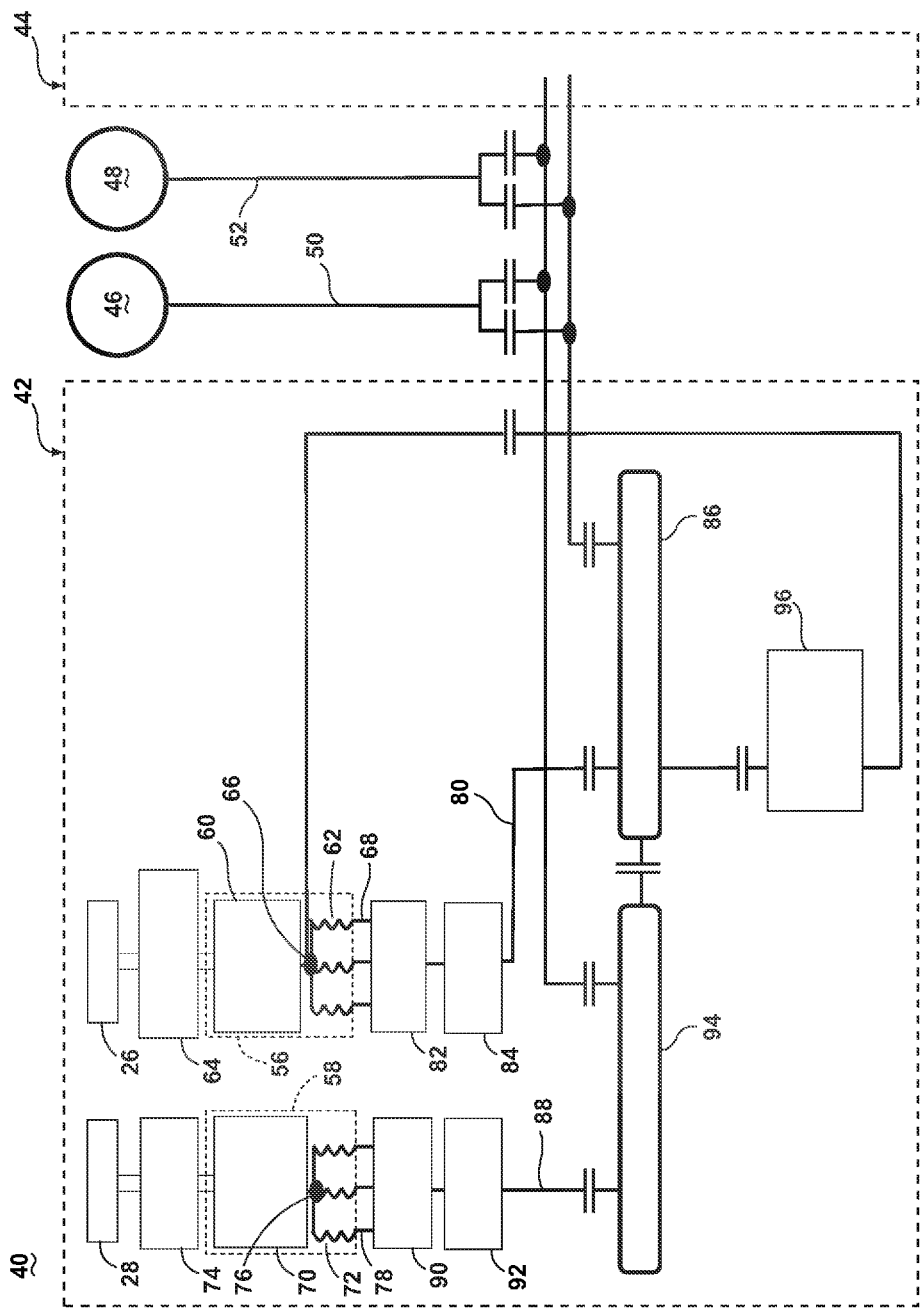
FIG. 2 is a schematic block diagram of an electrical power system architecture for the gas turbine engine of FIG. 1, the system architecture having a generator with an integrated autotransformer unit in accordance with a first embodiment of the invention.

FIG. 2 is a schematic block diagram of an electrical power system architecture 40 according to a first embodiment of the invention. The system architecture 40 includes multiple engine systems, shown herein as including at least a left engine system 42 and a right engine system 44. The left and right engine systems 42, 44 may be substantially identical; therefore, only the left engine system 42 will be described in detail for the sake of brevity. The left engine system 42 can include the HP and LP spools 26, 28 of the gas turbine engine 10 shown in FIG. 1, although the system architecture 40 has application to other engines as well. The left engine system 42 shown herein uses mechanical power provided by two spools, the HP spool 26 and the LP spool 28. However, the system architecture 40 could also be implemented on an engine having more than two spools, such as a 3-spool engine having an intermediate pressure spool in addition to the HP and LP spools. The system architecture 40 can further include an auxiliary power unit (APU) 46 of the aircraft and an external power source (EPS) 48. As shown herein, the APU 46 and EPS 48 each have a DC output 50, 52, respectively. In the embodiment illustrated, the left engine system 42 includes a first autotransformer unit (ATU) integrated generator 56, shown herein as an ATU integrated starter-generator 56, configured to produce variable frequency (VF) AC power from mechanical power supplied by the HP spool 26, and a second ATU integrated generator 58 configured to produce constant frequency (CF) AC power from mechanical power supplied by the LP spool 28.

The ATU integrated starter-generator 56 includes a power generation section 60 and an ATU section 62. As will be explained in greater detail below, the ATU section 62 is integrated with the power generation section 60 by integrating some of the electrical windings necessary for power transformation on the electrical winding of the power generation section 60. This essentially eliminates winding duplication in the power generation section 60 and the ATU section 62, which can translate into weight and cost savings for the aircraft.

The HP spool 26 can be operably coupled with the ATU integrated starter-generator 56 by an HP drive assembly having an input mechanically coupled to the HP spool 26 and an output mechanically coupled to the power generation section 62. One embodiment of the HP drive assembly is an accessory gearbox 64, where the ATU integrated starter-generator 56 can be mounted and coupled to the accessory gearbox 64. Within the accessory gearbox 64, power may also be transferred to other engine accessories. The power generation section 60 of the ATU integrated starter-generator 56 converts mechanical power supplied by the HP spool 26 into electrical power and produces a power supply 66 having three phase outputs. The ATU section 62 of the ATU integrated starter-generator 56 functions to both transform the three phase outputs of the power supply 66 into a nine phase power output 68 and to step up the voltage of the power supply.

The ATU integrated starter-generator 56 also provides a starting function to the aircraft. Alternatively, the ATU integrated generator 56 on the HP side of the left engine system 42 may comprise a generator that does not provide a starting function to the aircraft. In this case, a separate starter motor connected to the accessory gearbox 60 can be provided to perform the starting function for the aircraft. Furthermore, the left engine system 42 can include multiple generators drawing mechanical power from the HP spool 26 to produce power in order to provide a measure of redundancy.

The ATU integrated generator 58 includes a power generation section 70 and an ATU section 72. The LP spool 28 can be operably coupled with the ATU integrated generator 58 by an LP drive assembly having an input mechanically coupled to the LP spool 28 and an output mechanically coupled to the power generation section 70. One embodiment of the LP drive assembly is a constant speed drive (CSD) 74 which converts the variable speed input from the LP spool 28 to constant speed. As shown herein, the CSD 74 can be mechanically coupled to the ATU integrated generator 58 and drives the power generation section 70 at a constant speed. The power generation section 70 of the ATU integrated generator 58 converts mechanical power supplied by the LP spool 28 into electrical power and produces a power supply 76 having three phase outputs. The ATU section 72 of the ATU integrated generator 58 functions to both transform the three phase outputs of the power supply 76 into a nine phase power output 78 and to step up the voltage of the power supply. Due to the CSD, the power supplies 66, 76 will have constant frequency. Alternatively, the CSD 74 can be eliminated to produce a VF power output.

Although the embodiment shown herein is described as using one ATU integrated generator 58 on the LP side of the left engine system 42, another embodiment of the invention may use multiple ATU integrated generators 58 drawing mechanical power from the LP spool 28 to produce AC power in order to provide a measure of redundancy. Furthermore, while a separate ATU integrated generator 58 and CSD 74 are discussed herein, an integrated drive generator which combines the CSD 74 and ATU integrated generator 58 into a common unit can alternatively be used.

The power output 68 from the an integrated ATU integrated starter-generator 56 is supplied to first AC/DC converter for converting the AC power output 68 to a DC power output 80. As illustrated, the first AC/DC converter can include a first rectifier device 82 and a first filter 84 for converting the AC voltage to DC voltage and for evening out the current flow before being supplied to a first electrical bus 86. Similarly, the power output 78 from the ATU integrated generator 58 is supplied to second AC/DC converter for converting the AC power output 78 to a DC power output 88. As illustrated, the second AC/DC converter can include a second rectifier device 90 and a second filter 92 for converting the AC voltage to DC voltage and for evening out the current flow before being supplied to a second electrical bus 94.

A motor-starter controller 96 can selectively provide power from the first electrical bus 86 to the ATU integrated starter-generator 56 to initiate a starting procedure for the aircraft. The motor-starter controller 96 can be integrated with the ATU integrated starter-generator 56 for engine starting by connecting the motor-starter controller 96 to the specific location of the ATU integrated starter-generator 56 as shown FIG. 2. The three phase motor-starter controller 96 is connected to the three phase power supply 66 to drive the ATU integrated starter-generator 56 as a three phase starter for engine starting.

The first and second electrical buses 86, 94 are configured to supply DC power to one or more loads (not shown) that require a DC power supply. The first and second electrical buses 86, 94 can be selectively connected to enable loads to be shared by the HP spool 26 and the LP spool 28.

In operation, with the gas turbine engine 10 stared, HPT 22 rotates the HP spool 26 and the LPT 24 rotates the LP spool. The accessory gearbox 64 is driven by the rotating HP spool 26, and transmits mechanical power from the HP spool 26 to the ATU integrated starter-generator 56. The ATU integrated starter-generator 56 converts mechanical power supplied by the HP spool 26 into electrical power and produces the DC power output 80. The CSD 74 is driven by the rotating LP spool 28, and transmits mechanical power from the LP spool 28 to the ATU integrated generator 58. The ATU integrated generator 58 converts the mechanical power supplied by the LP spool 28 into electrical power and produces the DC power output 88. The power outputs 80, 88 can be respectively provided to the electrical buses 86, 94 configured to supply DC power to one or more loads (not shown) that require a DC power supply. Depending on the type of load drawing power, the DC power extracted by the system architecture 40 may undergo further processing before being used by the loads.

The DC power outputs 50, 52 of the APU 44 and the EPS 48 can also be provided to the electrical buses 86, 94.

The left and right engine systems 42, 44, APU 46 and EPS 48 can provide DC power to various loads of the aircraft as needed. The various DC outputs of the left engine system 42, the right engine system 44, the APU 46, and the EPS 48 are integrated with appropriate switches to provide no break power transfer (NBPT) to the aircraft.

Figure 3:
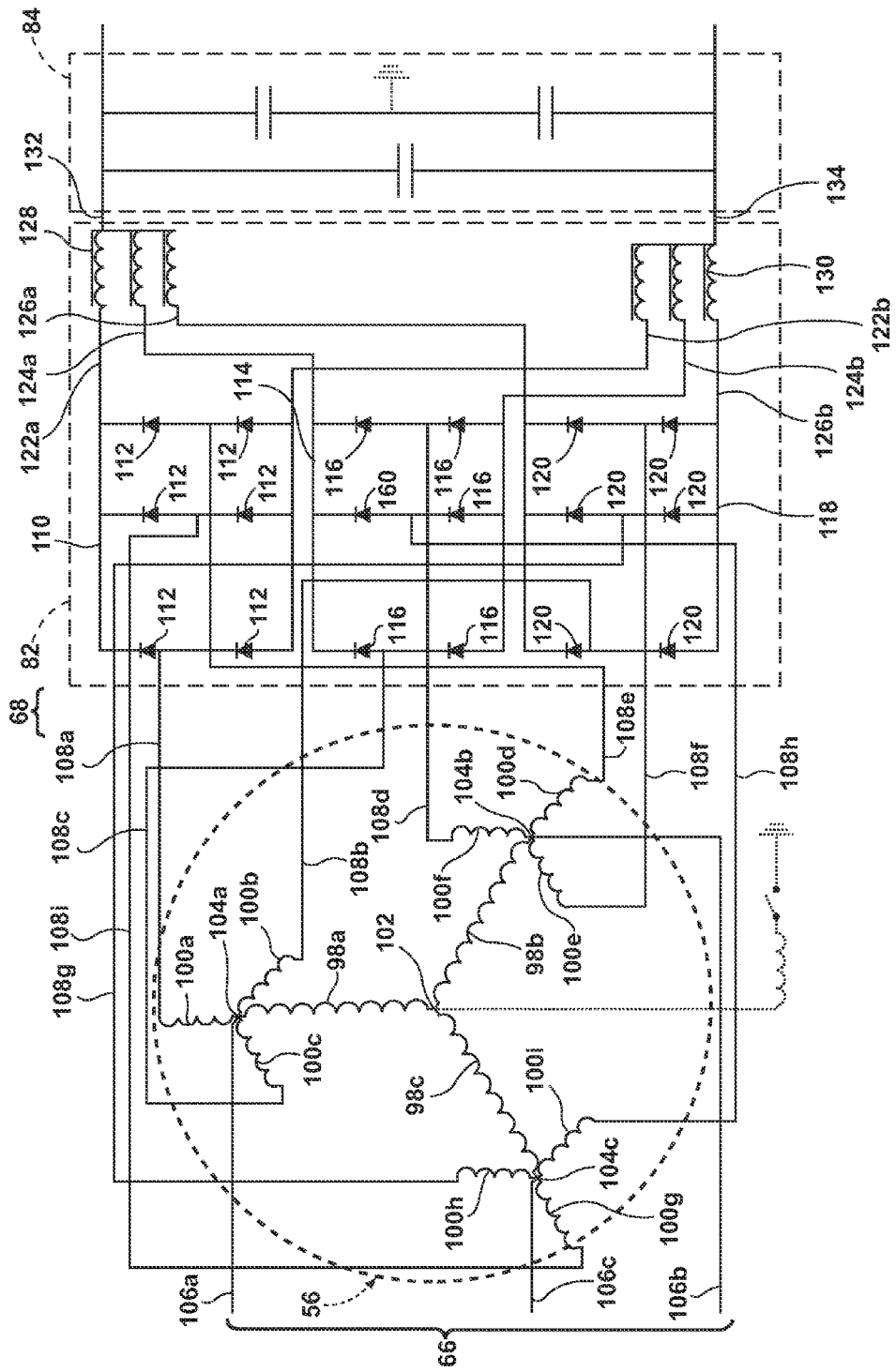
FIG. 3 is an electrical diagram of the generator with the integrated autotransformer unit and an AC-to-DC power converter of the electrical power system architecture of FIG. 2.

FIG. 3 is an electrical diagram of the ATU integrated starter-generator 56 and the first AC-to-DC power converter for use in the electrical power system architecture 40 of FIG. 2. The first and second ATU integrated generators 56, 58 and AC-to-DC power converters may be substantially identical for both the HP spool 26 and the LP spool 28; therefore, only the HP side of the left engine system 42 will be described in detail in FIG. 3 for the sake of brevity.

The ATU integrated starter-generator 56 can have a stator with three main or primary windings 98a to 98c and nine secondary windings 100a to 100i. The main windings 98a to 98c each have a neutral end connected to a common neutral point 102 and a tap 104a to 104c connected to one phase output 106a to 106c of the three phase output power supply 66. The phase outputs 106a to 106c are provided via conductors or lead wires to the three-phase motor-starter controller 96 (FIG. 2). The secondary windings 100a to 100i are connected in associated trios to one of the taps 104a to 104c on the main windings 98a to 98c, and are configured to generate the nine phase power output 68. In the illustrated embodiment, the primary windings 98a to 98c are arranged in a Wye configuration, with the overall configuration of integrated ATU being a star connected configuration. Alternatively, the primary windings 98a to 98c can be arranged in a Delta configuration, with the overall configuration of integrated ATU being a Delta or Extended Delta connected configuration.

The nine phase power output 68 is delivered by conductors 108a to 108i to the rectifier device 82. The conductors 108a to 108i can be lead wires. The rectifier device 82 can be integrated and packaged with the generator 56, or provided separately from the generator 56. The rectifier device 82 can include three rectifier bridges containing multiple diodes. The number of diodes is equal to the desired pulse count of the ATU integrated starter-generator 56. As shown herein, there are eighteen diodes, and so the pulse count is eighteen. Other numbers of diodes, such as 12, 18, 24, other multiples of six, etc. can also be used. One suitable type of diode is made from silicon carbide (SiC) due to its high temperature capability. Rectifying devices other than diodes can be used.

Although the illustrated integrated starter-generator 56 is shown as having a pulse count of eighteen, as mentioned above, the starter-generator 56 can be configured to have other pulse counts. For example, by providing two secondary windings 100 instead of three, a generator with a pulse count of twelve can be provided. In another example, by providing four secondary windings 100 instead of three, a generator with a pulse count of twenty-four can be provided.

As illustrated, the conductors 108a, 108e, and 108i are connected to a first rectifier bridge 110 having six diodes 112, the conductors 108c, 108d, and 108h are connected to a second rectifier bridge 114 having six diodes 116, and the conductors 108b, 108f, and 108g are connected to a third rectifier bridge 118 having six diodes 120. The three phases available on the conductors 108a, 108e, and 108i are rectified by the first rectifier bridge 110, with the diodes 112 delivering a first DC voltage between two first outputs 122a and 122b. The three phases available on the conductors 108c, 108d, and 108h are rectified in parallel by the second rectifier bridge 114, with the diodes 116 delivering a second DC voltage between two second outputs 124a and 124b. The three phases available on the conductors 108b, 108f, and 108g are also rectified in parallel by the third rectifier bridge 118, with the diodes 120 delivering a second DC voltage between two third outputs 126a and 126b.

One output 122a, 124a, and 126a from each rectifier bridge 110, 114, 118 is coupled to a first interphase transformer 128 which absorbs the instantaneous voltage differences between the outputs 122a, 124a, and 126a. The other output 122b, 124b, and 126b from each rectifier bridge 110, 114, 118 is coupled to a second interphase transformer 130 which absorbs the instantaneous voltage differences between the outputs 122b, 124b, and 126b. The junction points between the coils of the first and second interphase transformers 128, 130 form first and second outputs 132, 134, respectively, which are connected to the filter 84.

Figure 4:
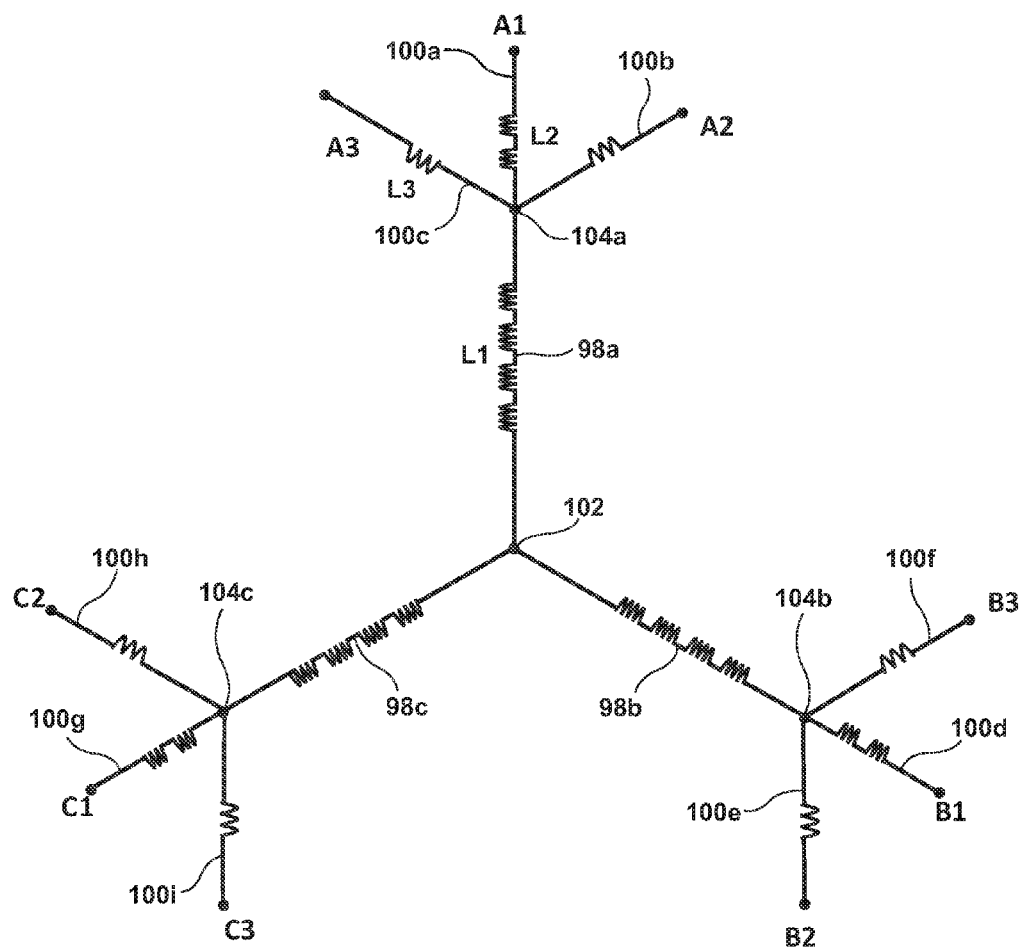
FIG. 4 is an electrical diagram of a stator winding for the generator with the integrated autotransformer unit from FIG. 3.

FIG. 4 is an electrical diagram of the stator winding for the ATU section 62 of the ATU integrated starter-generator 56 from FIG. 3. As discussed above, each main winding 98a to 98c extends from the common neutral point 102 to one of the taps 104a to 104c. The secondary windings 100a to 100c on the first main winding 98a extend from the tap 104a to a terminal A1, A2, A3, respectively. The secondary windings 100d to 100f on the second main winding 98b extend from the tap 104b to a terminal B1, B2, B3, respectively. The secondary windings 100g to 100i on the third main winding 98c extend from the tap 104c to a terminal C1, C2, C3, respectively.

Figure 5:
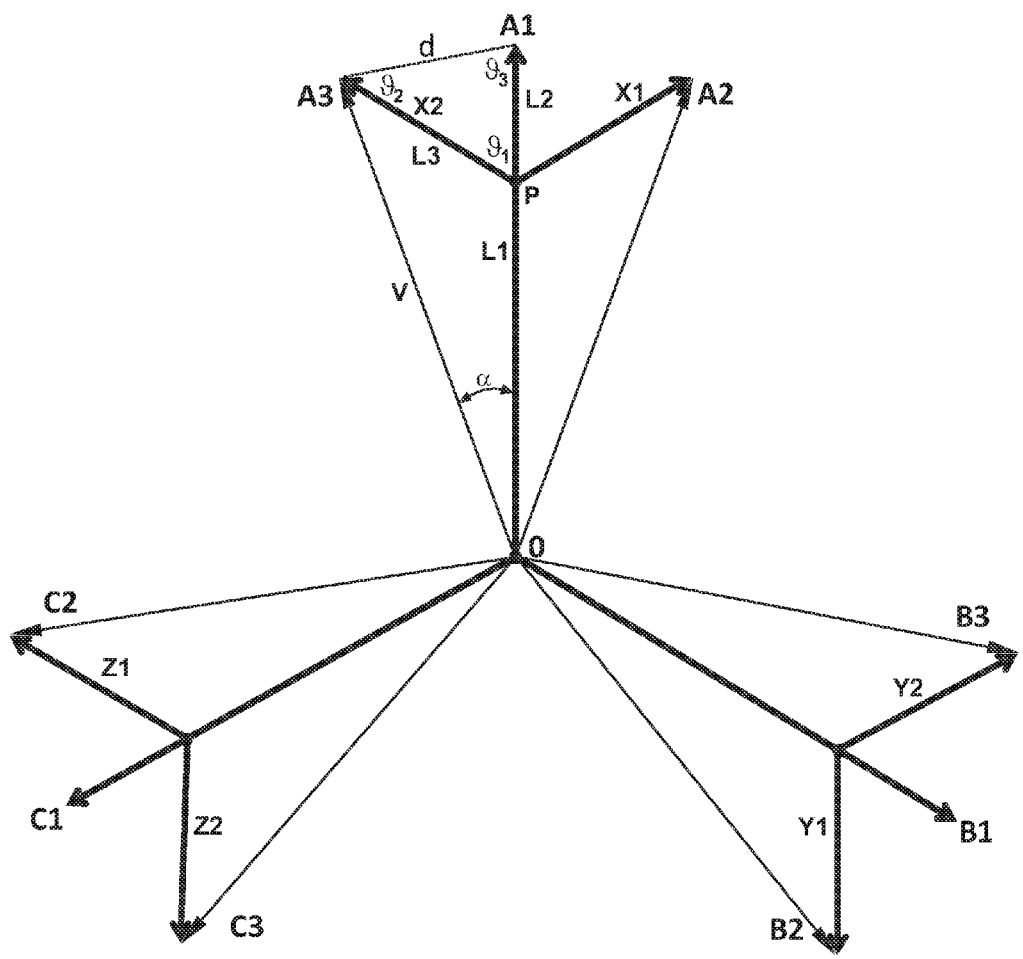
FIG. 5 is a winding vector diagram for the stator winding from FIG. 4.

FIG. 5 is a winding vector diagram for the stator winding for the ATU section 62 of the ATU integrated starter-generator 56 of FIG. 4. The winding vector diagram can be used to design the stator winding for the ATU section 62 of the ATU integrated starter-generator 56. The stator winding is illustrated herein as having a pulse count of eighteen, although the stator winding can also be configured to have a pulse count in other multiple of six, such as 12, 18, 24, etc.

As can be seen, the vector diagram includes nine main vectors A1, A2, A3, B1, B2, B3, C1, C2, C3 emanating from a common point of origin O, which corresponds to the neutral point 102 of the stator winding in FIG. 4. The main vectors A1-C3 represent the phase outputs which are delivered by conductors 108a to 108i to the rectifier device 82 in FIG. 3. The magnitude or length V of the main vectors A1-C3 represents the generated AC voltage and the direction or orientation of each main vector A1-C3 represents the phase from 0-360° of the generated AC voltage. As shown herein, the main vectors A1-C3 can have the same length V, but differ in phase by an angle α. The main vectors A1-C3 can be grouped, such that main vectors A1, B1, C1 represent the one three-phase output, the main vectors A2, B2, C2 represent another three-phase output, and the main vectors A3, B3, C3 represent the other three-phase output Each of the main vectors A1, B1, and C1 includes two sub-vectors X1, X2, Y1, Y2, Z1, Z2 emanating from a point P (which corresponds to the taps 104a-c in FIG. 4) to meet one of the other main vectors A2, A3, B2, B3, C2, C3. The distance between the common point of origin O and point P is represented as length L1. The distance from point P to the end of main vector A1 is represented as length L2. As such, the length V of the main vector A1, and therefore all the other main vectors A2, A3, B2, B3, C2, C3 is given by the following relationship:

$$V=|L1|+|L2|$$

Sub-vector X2 extends from main vector A1 to main vector A3 at an angle θ1 and has a length L3. While not shown in FIG. 5, the other sub-vectors X2, Y1, Y2, Z1, Z2 also have a length L3, and extend from the associated main vector at an angle equal to θ1. The ends of main vectors A1 and A3 are separated by a distance d, which together with lengths L2 and L3, form a triangle having vertices defining interior angles θ1, θ2, and θ3. The lengths L1-L3 and angles θ1 and a can be selected to design the stator winding for the ATU section 62 of the ATU integrated starter-generator 56 from FIG. 3.

The angles α, θ1, θ2, and θ3 are dependent on the number of pulses N, and the relationship therebetween is given by the following equations:

$$\alpha = 360/N$$

$$\theta 3 = \left(180° - \frac{360}{N}\right) \div 2$$

$$\theta 2 = 180° - \theta 1 - \theta 3$$

In this example, it can be given that N=18 and θ1=60°. Thus, angle α=20°, angle θ3=80° and angle θ2=40°. It is understood that θ2 or θ3 could be given instead of θ1.

The relationship between the lengths L2, L3, d and the angles θ1, θ2, and θ3 is known from the law of sines as:

$$\frac{|d|}{\sin\theta 1} = \frac{|L2|}{\sin\theta 2} = \frac{|L3|}{\sin\theta 3}$$

The distance d from the end of main vector A1 to the end of main vector A3 is given by the following relationship:

$$|d| = 2V\sin\frac{180}{N}$$

Using the law of sines, the lengths L2 and L3 are therefore given by the following relationships:

$$|L2| = \frac{|d|\sin\theta 2}{\sin\theta 1} = \frac{2V\sin\frac{180}{N}\sin\theta 2}{\sin\theta 1}$$

$$|L3| = \frac{|d|\sin\theta 3}{\sin\theta 1} = \frac{2V\sin\frac{180}{N}\sin\theta 3}{\sin\theta 1}$$

Using the relationship between the voltage V and lengths L1, L2, the length L1 can be determined using the following relationship:

$$|L1| = (V - |L2|)$$

Thus, by knowing the desired number of pulses N, the desired voltage V, and at least one other variable, the main stator winding for the ATU section 62 of the ATU integrated starter-generator 56 from FIG. 3 can be designed. In this case, the other variable given is θ1. However, it will be understood that another variable, such as a different angle or a length, could be given instead.

Figure 6:
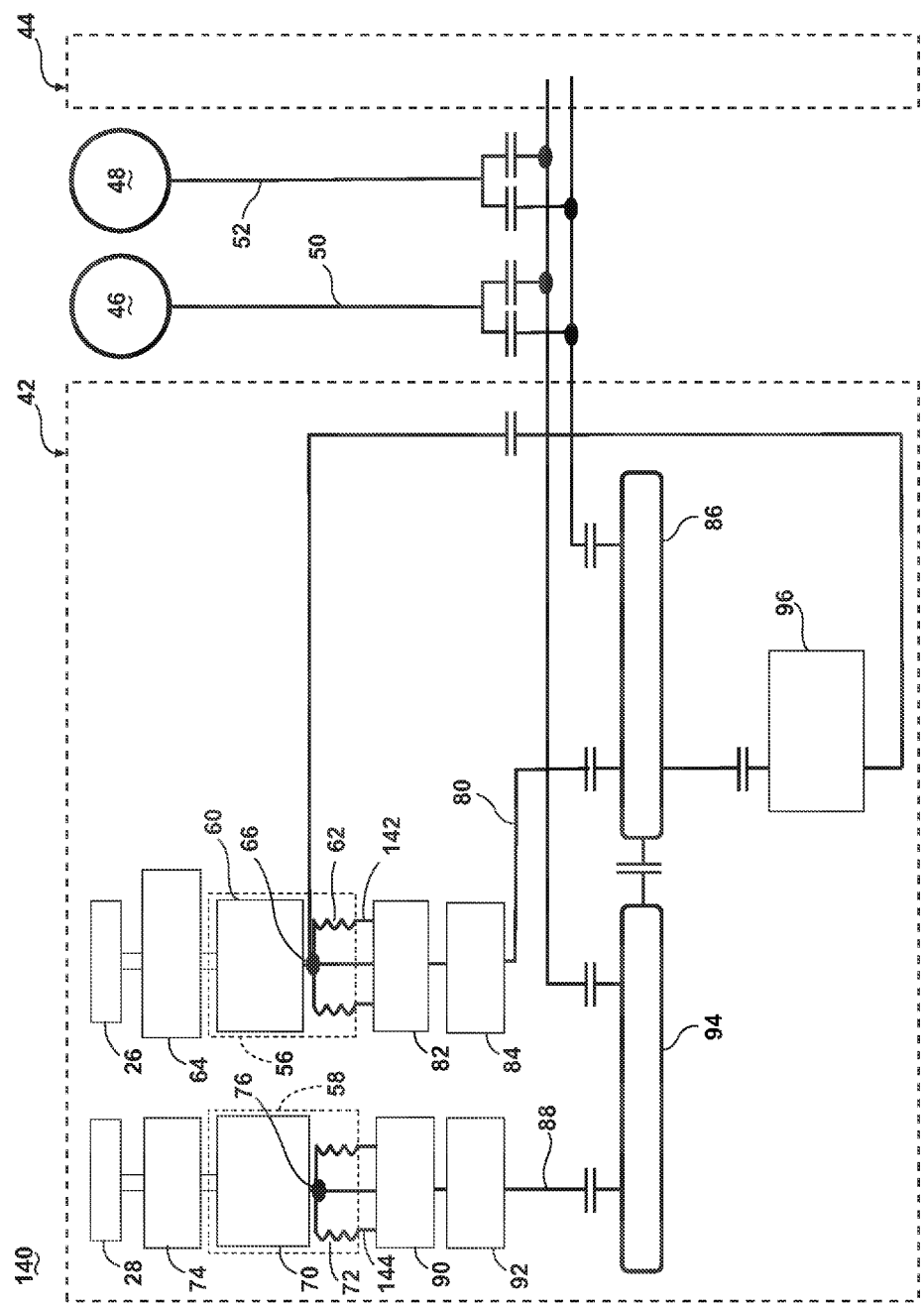
FIG. 6 is a schematic block diagram of an electrical power system architecture for the gas turbine engine of FIG. 1, the system architecture having an integrated autotransformer unit in accordance with a second embodiment of the invention.

FIG. 6 is a schematic block diagram of an electrical power system architecture 140 according to a second embodiment of the invention. The system architecture 140 may be substantially similar to the system architecture 40 shown in FIG. 2; therefore, like elements will be referred to using the same reference numerals. One difference between the system architecture 140 shown in FIG. 6 and the system architecture 40 shown in FIG. 2 is that, for both ATU integrated generators 56, 58, the ATU section 62, 72 functions to transform the three phase outputs of the power supply 66, 76 into a nine phase power output 142, 144 by adding two secondary windings instead of adding three windings.

Figure 7:
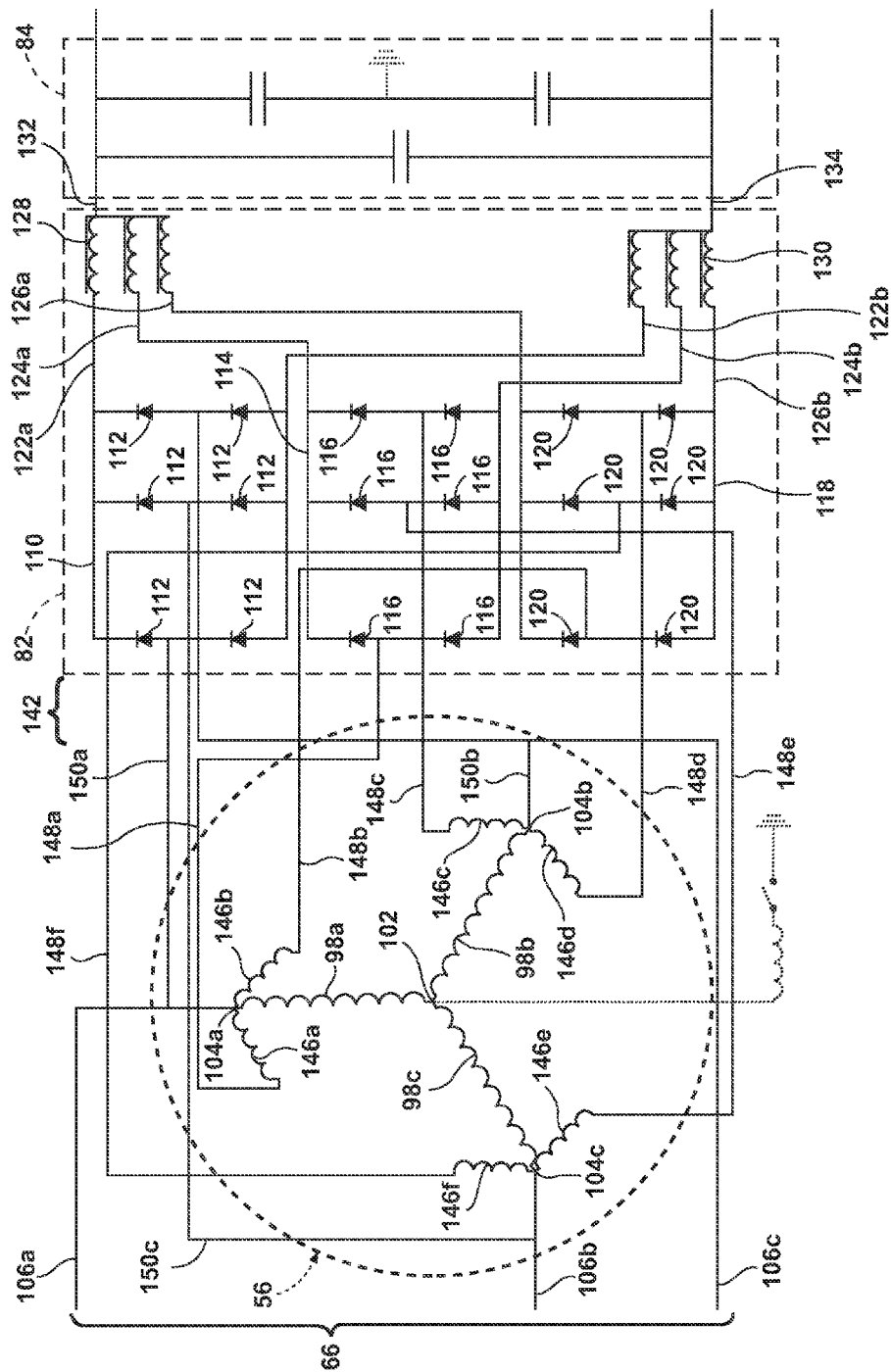
FIG. 7 is an electrical diagram of the generator with the integrated autotransformer unit and an AC-to-DC power converter of the electrical power system architecture of FIG. 6.

FIG. 7 is an electrical diagram of the ATU integrated starter-generator 56 and the first AC-to-DC power converter for use in the electrical power system architecture 140 of FIG. 6. The first and second ATU integrated generators 56, 58 and AC-to-DC power converters may be substantially identical for both the HP spool 26 and the LP spool 28; therefore, only the HP side of the left engine system 42 will be described in detail in FIG. 7 for the sake of brevity.

The ATU integrated starter-generator 56 can have six secondary windings 146a to 146f connected in associated duos to one of the taps 104a to 104c on the main windings 98a to 98c. In the illustrated embodiment, the primary windings 98a to 98c are arranged in a Wye configuration, with the overall configuration of integrated ATU being a fork connected configuration. Alternatively, the primary windings 98a to 98c can be arranged in a Delta configuration.

The nine phase power output 142 is delivered by conductors 148a to 148i and 150a to 150c to the rectifier device 82. The conductors 148a, 148c, and 148e are connected to the second rectifier bridge 114 and the conductors 148b, 148d, 148f are connected to the third rectifier bridge 118. Conductors 150a to 150c extend from primary windings 98a to 98c, and are connected to the first rectifier bridge 110. The conductors 148a to 148i and 150a to 150c can be lead wires. The remaining rectification and filtering of the power is the same as described above for FIG. 3.

Although the illustrated integrated starter-generator 56 is shown as having a pulse count of eighteen, the starter-generator 56 can be configured to have other pulse counts. For example, by providing one secondary winding 146 instead of two, a generator with a pulse count of twelve can be provided. In another example, by providing three secondary windings 146 instead of two, a generator with a pulse count of twenty-four can be provided.

Figure 8:
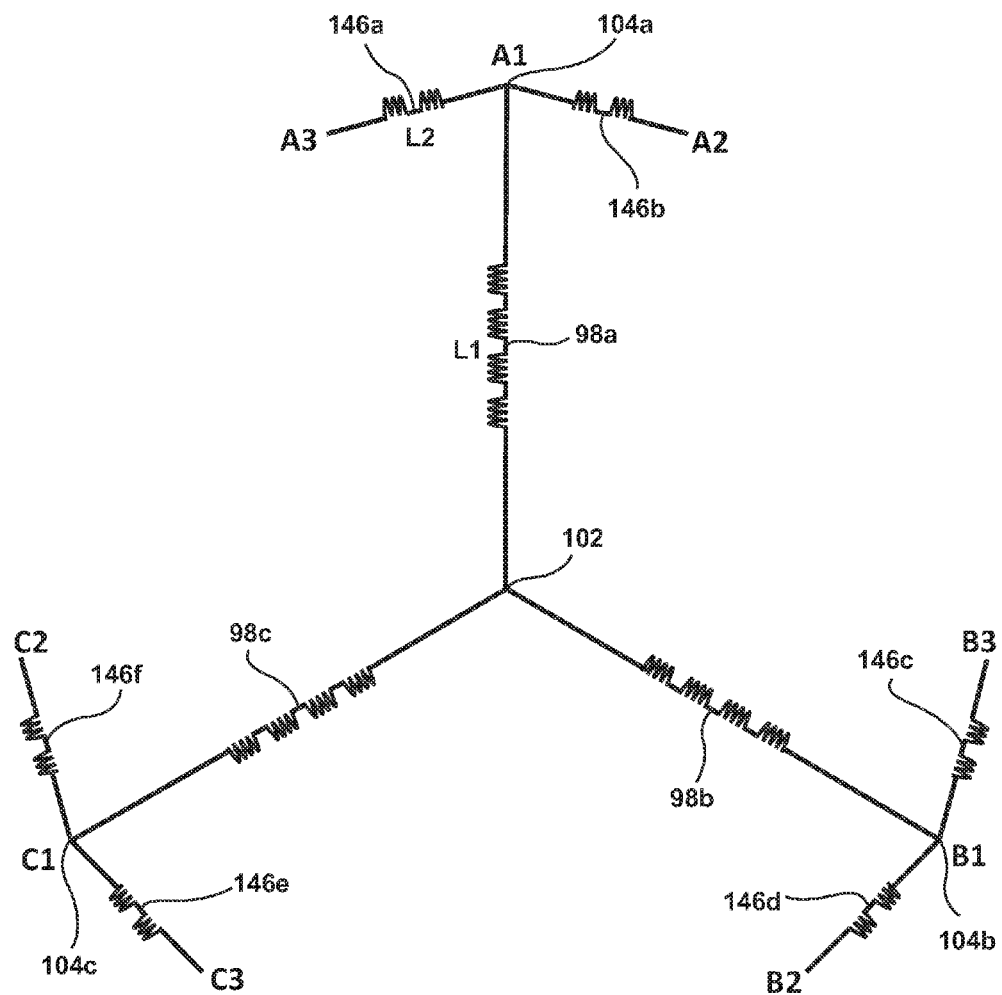
FIG. 8 is an electrical diagram of a stator winding for the generator with the integrated autotransformer unit from FIG. 3.

FIG. 8 is an electrical diagram of the stator winding for the ATU section 62 of the ATU integrated starter-generator 56 from FIG. 7. As discussed above, each main winding 98a to 98c extends from the common neutral point 102 to one of the taps 104a to 104c. The secondary windings 146a and 146b on the first main winding 98a extend from the tap 104a, also shown as terminal A1, to a terminal A2 and A3, respectively. The secondary windings 146c and 146d on the second main winding 98b extend from the tap 104b, as shown as terminal B1, to a terminal B2 and B3, respectively. The secondary windings 146e and 146f on the third main winding 98c extend from the tap 104c, also shown as terminal C1, to a terminal C2 and C3, respectively.

Figure 9:
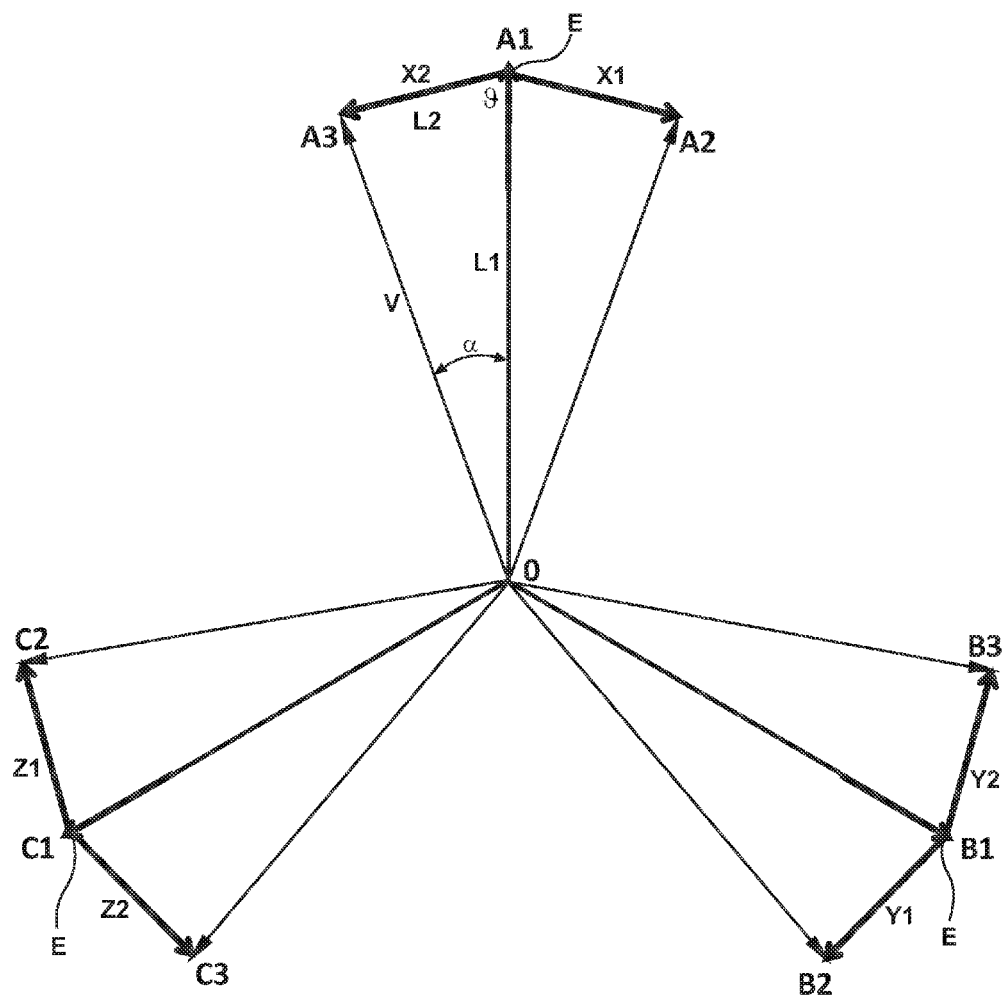
FIG. 9 is a winding vector diagram for the stator winding from FIG. 8.

FIG. 9 is a winding vector diagram for the stator winding for the ATU section 62 of the ATU integrated starter-generator 56 of FIG. 8. The winding vector diagram can be used to design the stator winding for the ATU section 62 of the ATU integrated starter-generator 56. The stator winding is illustrated herein as having a pulse count of eighteen, although the stator winding can also be configured to have a pulse count in other multiple of six, such as 12, 18, 24, etc.

As can be seen, the vector diagram includes nine main vectors A1, A2, A3, B1, B2, B3, C1, C2, C3 emanating from a common point of origin O, which corresponds to the neutral point 102 of the stator winding in FIG. 8. The main vectors A1-C3 represent the phase outputs which are delivered by conductors 148a-f and 150a-c to the rectifier device 82 in FIG. 7. The magnitude or length V of the main vectors A1-C3 represents the generated AC voltage and the direction or orientation of each main vector A1-C3 represents the phase from 0-360° of the generated AC voltage. As shown herein, the main vectors A1-C3 can have the same length V, but differ in phase by an angle α.

Each of the main vectors A1, B1, and C1 includes two sub-vectors X1, X2, Y1, Y2, Z1, Z2 emanating from an end point E (which corresponds to the taps 104a-c in FIG. 8) to meet one of the other main vectors A2, A3, B2, B3, C2, C3. The distance between the common point of origin O and end point E is represented as length L1. As such, the length V of the main vector A1, and, therefore, all the other main vectors A2, A3, B2, B3, C2, C3 is given by the following relationship:

$$V = |L1|$$

Sub-vector X2 extends from main vector A1 to main vector A3 at an angle θ and has a length L2. While not shown in FIG. 9, the other sub-vectors X2, Y1, Y2, Z1, Z2 also have a length L2, and extend from the associated main vector at an angle equal to θ. The lengths L1 and L2 and angles θ and α can be selected to design the stator winding for the ATU section 62 of the ATU integrated starter-generator 56 from FIG. 7.

The angles θ and α are dependent on the number of pulses N, and the relationship therebetween is given by the following equations:

$$\theta = \left(180° - \frac{360}{N}\right) \div 2$$

$$\alpha = 360/N$$

In this example, it can be given that N=18. Thus, angle α=20° and angle θ=80°.

The length L2 from end point E to the end of main vector A3 is given by the following relationship:

$$|L2| = 2V\sin\frac{180}{N}$$

Thus, by knowing the desired number of pulses N and the desired voltage V, the main stator winding for the ATU section 62 of the ATU integrated starter-generator 56 from FIG. 3 can be designed.

Figure 10:
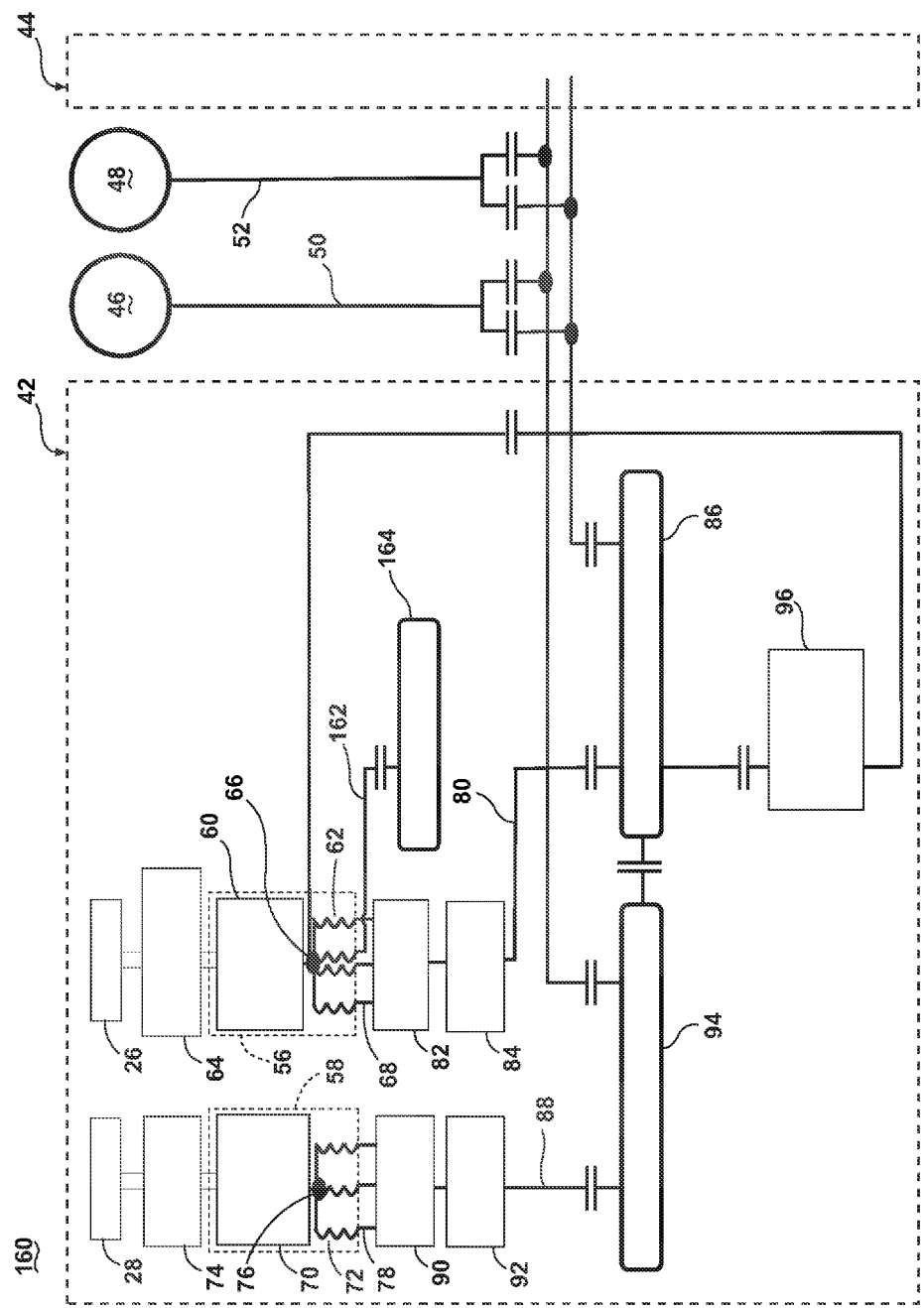
FIG. 10 is a schematic block diagram of an electrical power system architecture for the gas turbine engine of FIG. 1, the system architecture having a generator with an integrated autotransformer unit in accordance with a third embodiment of the invention.

FIG. 10 is a schematic block diagram of an electrical power system architecture 160 according to a third embodiment of the invention. The system architecture 160 may be substantially similar to the system architecture 40 shown in FIG. 2; therefore, like elements will be referred to using the same reference numerals. One difference between the system architecture 160 shown in FIG. 10 and the system architecture 40 shown in FIG. 2 is that the ATU section 62 includes an AC power output 162 that is supplied to an AC bus 164, in addition to the nine phase power output 68.

Figure 11:
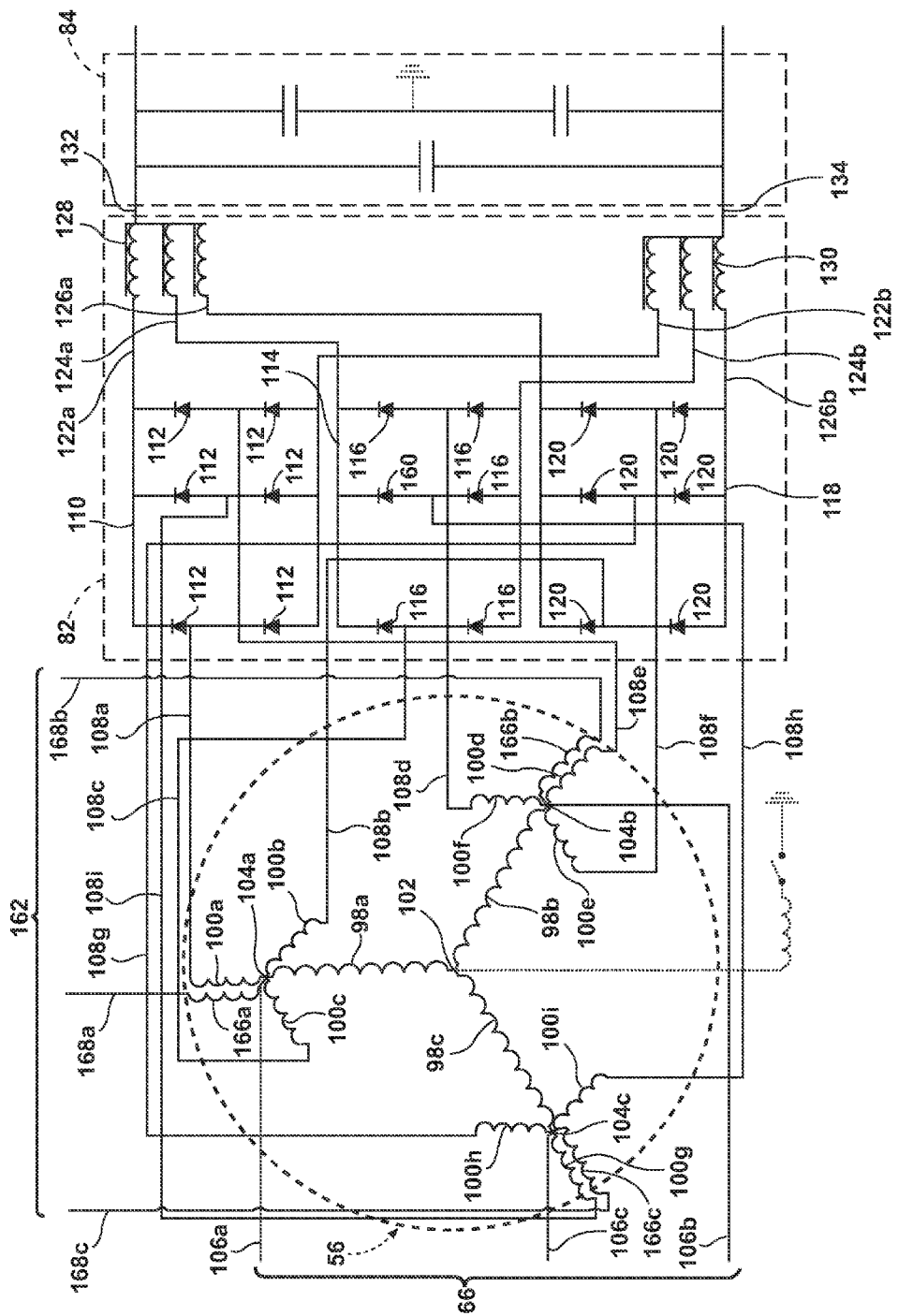
FIG. 11 is an electrical diagram of the generator with the integrated autotransformer unit and an AC-to-DC power converter of the electrical power system architecture of FIG. 10.

FIG. 11 is an electrical diagram of the ATU integrated starter-generator 56 and the first AC-to-DC power converter for use in the electrical power system architecture 160 of FIG. 10. The ATU integrated starter-generator 56 can be substantially similar to the ATU integrated starter-generator 56 of the first embodiment shown in FIG. 3, with the exception that additional secondary windings 166a to 166c are provided on the main windings 98a to 98c. The additional secondary windings 166a to 166c can be connected by one of the taps 104a to 104c connected to one phase output 106a to 106c of the three phase output power supply 66. The phase outputs 106a to 106c are provided to the three-phase motor-starter controller 96 (FIG. 10). The AC power output 162 is delivered by conductors 168a to 168c from the windings 166a to 166c to the AC bus 164 (FIG. 10) without being converted to DC by the rectifier device 82. The conductors 168a to 168c can be lead wires. The remaining rectification and filtering of the DC power is the same as described above for FIG. 3.

The system architecture disclosed herein provides an integrated ATU generator for an aircraft. One advantage that may be realized in the practice of some embodiments of the described systems and methods is that the traditional high pulse count ATU can be eliminated, and its equivalence is integrated into at least one of the generator (s) that is connected to a rectifying device to generate a low harmonic content DC output. This arrangement significantly reduces the weight of the engine, and can simplify the cooling for engine components. The provision of the integrated ATU generator can also eliminate the space needed for a separate ATU in the aircraft.

Another advantage that may be realized in the practice of some embodiments of the described systems and methods is that the ATU integrated starter-generator 56 does not jeopardize the use of the three phase motor-starter controller 96, since the motor-starter controller 96 is connected to the three phase power supply 66 before it is transformed to a nine phase power output in the ATU section 62 of the ATU integrated starter-generator 56.

Another advantage that may be realized in the practice of some embodiments of the described systems and methods is that DC power can be extracted from both spools 26, 28 of a gas turbine engine 10. The operating efficiency of the gas turbine engine 10 is also increased by seamlessly controlling the power drawn from HP and LP spools 26, 28. In addition to the DC power drawn from the HP and LP spools 26, 28, the DC outputs 50, 52 from the APU 46 and the EPS 48 can be integrated to provide no break power transfer (NBPT).

Another advantage that may be realized in the practice of some embodiments of the described systems and methods is that the system architecture(s) can offer a level of redundant DC power generation, since DC power can be extracted from the LP spool 28 as well as the HP spool 26 of the gas turbine engine 10. Drawing power from both spools 26, 28 offers increased redundancy for DC power, such that in the event of a failure of one of the spools 26, 28 or generators 42, 44, DC power may still be extracted from the remaining operational spool 26, 28 and generator 42, 44.

Still another advantage that may be realized in the practice of some embodiments of the described systems and methods is the avoidance of engine stall issues that are typically encountered during a descend mode of the aircraft by sharing the DC load between the HP and LP spools 26, 28. Being able to draw power from the LP spool as well as the HP spool permits allows the aircraft to run at lower rpms during descent without risk of stall, thereby preserving fuel efficiency of the aircraft.

Yet another advantage that may be realized in the practice of some embodiments of the described systems and methods is that both AC and DC power can be extracted from the gas turbine engine 10. The third embodiment of the invention described herein in particular provides a system architecture which gives an air framer access to both types of power, such that an air framer can select either type of power for a particular application on an aircraft.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrical architecture for a turbine engine having a high pressure (HP) spool and a low pressure (LP) spool comprising:
   a first generator driven by the HP spool and providing a first DC output;
   a second generator driven by the LP spool and providing a second DC output;
   a first DC bus connected to the first DC output;
   a second DC bus connected to the second DC output; and
   wherein the first and second DC buses are selectively connected.

2. The electrical architecture of claim 1 further comprising an accessory gearbox connecting the HP spool to the first generator.

3. The electrical architecture of claim 2 further comprising a constant speed device connecting the HP spool to the first generator.

4. The electrical architecture of claim 1 further comprising an AC output integrated with at least one of the first generator and the second generator.

5. The electrical architecture of claim 4 further comprising an AC bus connected to the AC output.

6. The electrical architecture of claim 5 further comprising a plurality of DC loads connected to at least one of the first and second DC buses and a plurality of AC loads connected to the AC bus.

7. The electrical architecture of claim 6 further comprising a first plurality of DC loads connected to the first DC bus and a second plurality of DC loads connected to the second DC bus, wherein the first and second DC buses are selectively coupled to provide load balancing for the first and second plurality of loads.

8. The electrical architecture of claim 7 further comprising an auxiliary power unit providing a third DC output, which is selectively connected to at least one of the first and second DC buses.

9. The electrical architecture of claim 8 further comprising an external power source providing a fourth DC output, which is selectively connected to at least one of the first and second DC buses.

10. The electrical architecture of claim 1 further comprising a plurality of DC loads connected to at least one of the first and second DC buses.

11. The electrical architecture of claim 10 further comprising a first plurality of DC loads connected to the first DC bus and a second plurality of DC loads connected to the second DC bus, wherein the first and second DC buses are selectively coupled to provide load balancing for the first and second plurality of loads.

12. The electrical architecture of claim 1 further comprising an auxiliary power unit providing a third DC output, which is selectively connected to at least one of the first and second DC buses.

13. The electrical architecture of claim 1 further comprising an external power source providing a third DC output, which is selectively connected to at least one of the first and second DC buses.

14. The electrical architecture of claim 1 wherein at least one of the first and second generators comprises an integrated rectifier to output the corresponding first and second DC output.

15. The electrical architecture of claim 14 wherein both the first and second generators comprise an integrated rectifier to output the corresponding first and second DC outputs.

* * * * *